United States Patent

[11] 3,572,799

| [72] | Inventors | Robert E. Truesdell<br>887 Croyden St., Rochester, Mich. 48063;<br>William H. Nienstedt, 5202 Yorkshire St.,<br>Detroit, Mich. 48224 |
|---|---|---|
| [21] | Appl. No. | 809,585 |
| [22] | Filed | Mar. 24, 1969 |
| [45] | Patented | Mar. 30, 1971 |

[54] RESILIENT BUFFER STRIP
11 Claims, 8 Drawing Figs.

[52] U.S. Cl. ...................................................... 293/1,
52/718, 161/121, 293/62
[51] Int. Cl. ...................................................... B32b 5/00,
B60r 19/08, E04b 1/62
[50] Field of Search ....................................... 52/716,
717; 161/121; 293/54 (D), 66; 52/718;
293/1, 62

[56] References Cited
UNITED STATES PATENTS
2,128,656  8/1938  Long .......................... 293/66
2,986,419  5/1961  Barenyi ....................... 293/62
3,290,082  12/1966  Fritsch ........................ 293/1
3,439,950  4/1969  Kunevicius .................. 293/62X
3,458,386  7/1969  Shanok et al. .............. 161/121

*Primary Examiner*—Arthur L. La Point
*Assistant Examiner*—Howard Beltran
*Attorney*—Benjamin W. Colman ABSTRACT: This invention pertains to an exterior molding structure for use on automobile doors and side panels as a resilient bumper strip adapted to receive blows from metallic bodies striking against such doors or panels. The bumper strip is formed of a longitudinally extending metallic molding, adapted to be secured to the panels by retaining members or an adhesive, and a longitudinally extending medially disposed strip of plastic material having an outer surface projecting beyond the plane of the metallic-molding strip and secured thereto by a welded element substantially embedded within the mass of plastic material and having a surface portion disposed closely adjacent a surface of the metallic molding strip with which it is welded, preferably by series welding.

PATENTED MAR 30 1971 3,572,799
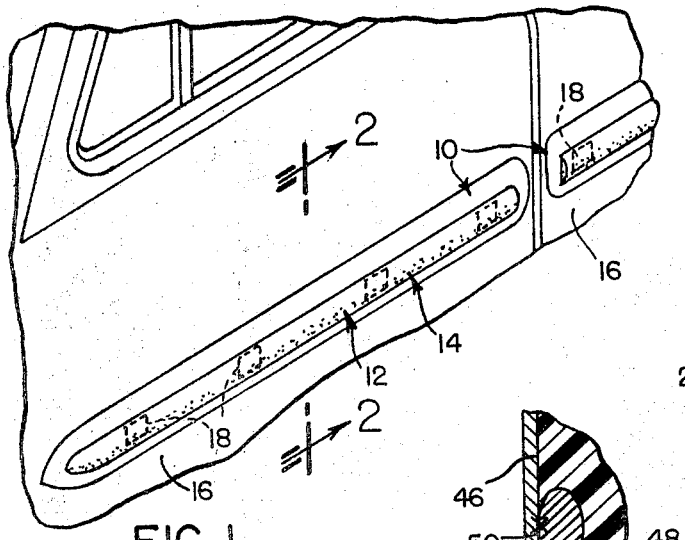
FIG. 1
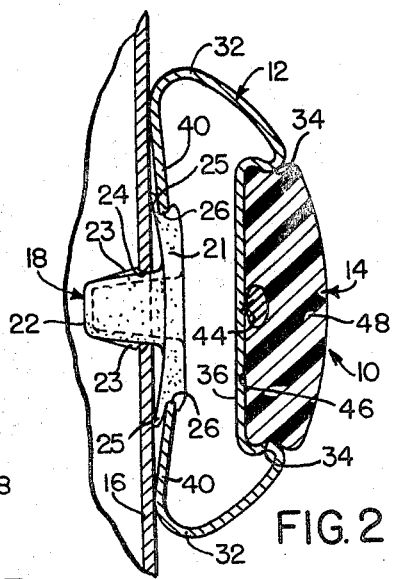
FIG. 2
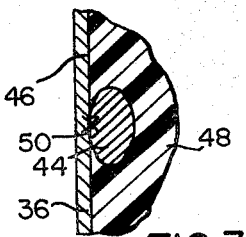
FIG. 3
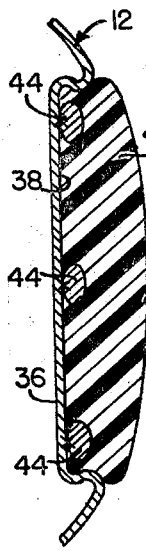
FIG. 4
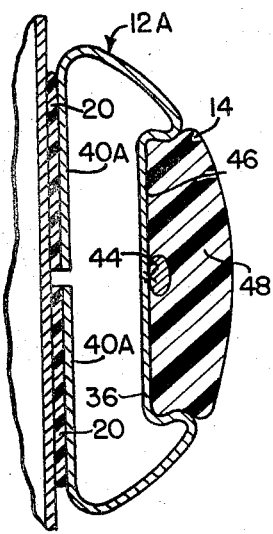
FIG. 7
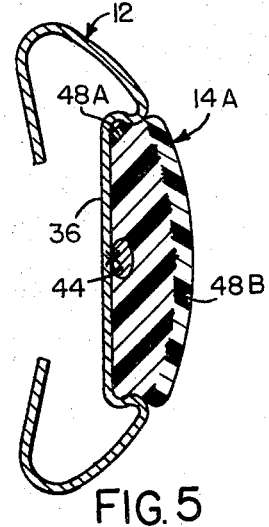
FIG. 5
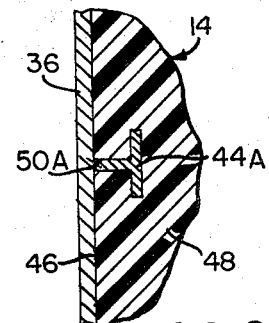
FIG. 6
FIG. 8
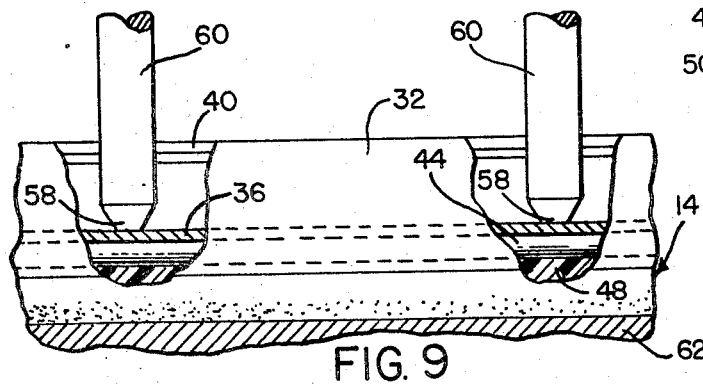
FIG. 9
INVENTORS
ROBERT E. TRUESDELL
BY & WILLIAM H. NIENSTEDT
ATTORNEY

RESILIENT BUFFER STRIP

The invention involves an exterior molding structure, sometimes herein disclosed as a bumper strip which is adapted be secured to the outer surface of automobile doors and body panel members, sometimes herein described only as panels, whether painted or unpainted. The bumper strip is provided with an outer exposed facing strip of a plastic material adapted to receive the bumps and bruises of bodies directed toward the automobile upon which it is mounted. The bumper strip comprises basically a supporting metallic strip of material having lateral longitudinally extending flanges which can be secured by clip members or a suitable adhesive to the side panels of an automobile body element, and also having a medially disposed groove or recess within which the plastic strip is seated and secured. The plastic strip embodies one or more embedded metallic wires having a cross section of such configuration that the wire is substantially embedded within the thermoplastic material except for a surface portion of the wire that remains exposed at an adjacent surface of the plastic material. This surface portion of the wire element is secured to the metallic molding strip by welding, preferably by the conventional series welding process. The cross-sectional configuration of the wire element is preferably such as to provide a substantial amount of contact between the plastic material and the wire element, so that upon welding the plastic strip will be positively secured to the metallic molding strip and separation therefrom will be prevented, even under the application of a severe blow or blows received by and directed against the composite exterior molding structure.

In the past, a number of exterior molding structures or bumper strips have been employed to provide some protection against the blows of adjacent automobile doors which swing against the side panels and doors of another closeby automobile. Although generally, people are respectful of another's property, very often thoughtless persons do swing their car doors so as to bump into the doors or side panels of an adjacent automobile, particularly in congested parking areas or where an insufficient amount of room is available for opening an automobile door so as to freely and easily allow a passenger or driver to leave or enter. The invention is not designed to protect an automobile from collision with another moving vehicle. In such instance, the forces generated by impact are extremely high and no exterior molding strip could possibly accept and ward off the other moving vehicle. The bumper strip of this invention is primarily designed to cushion the blow or blows from a swinging door so as to protect the exterior finish on an adjacent automobile body door or side panels.

The prior art structures of which applicant has knowledge include an exterior molding structure comprising a longitudinally extending metallic-molding strip, generally of the configuration disclosed herein, having longitudinally spaced slots in its recessed web portion adapted to receive projecting lugs of a medially disposed longitudinally extending relatively soft resilient plastic insert strip. The plastic strip has a generally T-shaped cross-sectional configuration in the area through the projecting lugs. The slots are pierced through the metallic-molding strip in such a manner as to leave angular tangs of metal which are designed to mechanically grip and engage the plastic lugs inserted through the slots and against the tangs. Another prior art structure is that disclosed in Fritsch U.S. Pat. No. 3,290,082 issued Dec. 6, 1966, in which a relatively soft resilient plastic bumper strip is purportedly secured in a longitudinally extending metallic-molding strip by frictional engagement. The apparent limitations of such prior art structures appear to lie in the reliance upon a mechanical frictional attachment of a relatively soft resilient plastic material with the supporting metallic-molding strip.

The plastic material of the insert strip may be made of a single composition, preferably though not exclusively taken from the group of materials including polyvinyl chlorides, acetates, styrenes, combinations of acetate and styrene plastic materials, polyethylenes, butyrates, acrylics, or their equivalents. These material may have an admixed filler, such for example as inorganic pigments, metallic oxides, mineral powders, diatomaceous earths, synthetic fibers, or powdered metals. The exterior surface of such plastic materials may be fully exposed to receive the bumps or flows from other bodies. Or, the exposed surface of the thermoplastic material may have an outer covering or coating of a polyester material, such as a Mylar film, or a relatively thin metallic strip secured thereto. Another preferred construction for the plastic insert strip of this invention is that of a duplex strip formed as a dual extrusion of a carrier portion and an outer surface layer portion. The carrier portion is preferably made of a relatively hard and rigid filled vinyl, acetate, styrene or combination of acetate and styrene plastic materials, comprising the principal portion or main body of the plastic insert strip. The second or surface layer portion of the dual extrusion is preferably made of a relatively pure vinyl, or a vinyl with a color filler, and is substantially softer and more flexible than the carrier portion. The relative hardness of the carrier portion is of the order of from about approximately 80 and 100 on a durometer scale, and the relative hardness of the surface layer portion is of the order of about approximately 60 to 65 on a durometer scale.

Series welding of the wire element imbedded in the plastic insert strip to the exterior supporting molding strip is well known in the art and is commonly practiced where access to one of two metallic bodies to be welded is very difficult or cannot be achieved. In most instances, welding by electrical resistance is normally performed by placing the two metallic bodies between electrodes, forming a circuit, and passing a sufficiently high current therebetween to effect fusion of the metallic bodies. Where electrodes cannot be directly imposed upon one of the metallic bodies to be welded, what is conventionally known as "series welding" is often adopted and used. In this process, spaced-apart electrodes are positioned upon the same side of one of the metallic bodies and the second metallic body to be welded thereto is brought into close intimate contact therewith under pressure. A welding current of sufficient magnitude is passed into and through the first metallic body and the closely adjacent contacting second metallic body from one electrode to the other, effecting the necessary fusion of the two metallic bodies in the area where the current has passed. Specific details in respect to this process are well known in the welding art and can be readily obtained from a number of sources including generally technical publications, trade journals, and processing companies.

Although in all of the embodiments disclosed herein the exterior metallic-molding strip is shown and described with slightly inturned retaining elements adapted to mechanically grip lateral edge portions of the plastic insert strip located in a recess of the metallic-molding strip, the invention provides the principal securement by the welded juncture of the imbedded wire of the plastic insert strip with the exterior metallic molding strip.

It is an object of the invention to provide an exterior molding structure, as a bumper strip for automobile side panels and doors, having an outer facing resilient plastic strip portion adapted to receive and cushion the blows and shocks of bodies striking against it and secured by welding to a supporting metallic-molding strip adapted to be secured to the side panels by suitable fastening means. Another object is to provide the resilient plastic strip portion with an embedded metallic element extending longitudinally of the strip portion and closely adjacent a surface thereof so as to expose an area of the embedded element for physical contact and fusion with the metallic-molding strip. A further object is to provide an embedded metallic element such as a wire, in a form and configuration adapted to be firmly secured in the plastic strip portion so as to retain such portion upon the metallic-molding strip when welded to the latter strip by electrical resistance series welding. Yet another object is to provide adhesive means upon longitudinally extending portions of the metallic-molding strip for securement of the exterior molding structure to automobile side panels and doors.

Various further and more specific objects, features and advantages of the invention will appear from the description given below, taken in connection with the accompanying drawings, illustrating by way of example preferred forms of the invention. Reference is here made to the drawings annexed hereto and forming an integral part of this specification, in which:

FIG. 1 is a fragmentary perspective view of a portion of an automobile door panel having a preferred embodiment of the exterior molding structure of this invention attached and secured thereto;

FIG. 2 is a vertical sectional view taken substantially on the line 2—2 of FIG. 1;

FIG. 3 is a fragmentary enlarged vertical sectional view of the area in FIG. 2 including the longitudinally extending metallic retention element embedded in the plastic strip portion welded to the supporting metallic-molding strip;

FIG. 4 is a fragmentary vertical sectional view similar to FIG. 2 showing a plurality of embedded metallic retention wires secured by welding to the supporting metallic-molding strip;

FIG. 5 is a view similar to FIG. 2 illustrating a plastic insert strip for the exterior molding structure, comprising a dual durometer extrusion;

FIG. 6 is a view similar to FIG. 3, particularly illustrating a longitudinally extending metallic retention element having a T-shaped cross-sectional configuration, embedded in the plastic insert strip;

FIG. 7 is a view similar to FIG. 2 illustrating the securement of the exterior molding structure to the automobile side panel with an adhesive layer applied to flange portions of the metallic-molding strip;

FIG. 8 is a view similar to FIGS. 3 and 6, particularly illustrating a longitudinally extending metallic element having a generally channel-shaped cross-sectional configuration embedded in the plastic insert strip;

FIG. 9 is a fragmentary side elevational view partially in section illustrating the application of electrical resistance welding electrodes to the metallic-molding strip in the series welding process.

As shown in the several views of the drawing, the exterior molding structure 10 comprises the longitudinally extending metallic-molding strip 12 and the longitudinally extending plastic insert strip 14 fusingly secured thereto. The combination strip 10 is attached to the exterior door panel 16 (or adjacent side panels) by a plurality of spaced-apart retaining elements or clips 18 arranged in alignment for engagement with the metallic-molding strip 12 (FIG. 2), or the strip 10 is attached to the door panel 16 by a layer or layers of a suitable adhesive material 20 applied to longitudinally extending portions of the metallic-molding strip 12 adapted to lie closely adjacent the door panel 16 (FIG. 7).

The retaining clips 18 are made of a suitable plastic material, of conventional construction, and generally comprise a body element 21, a projecting lug or tab 22 having laterally disposed tangs 23,23 adapted to engage the sheet metal panel 16 adjacent the perimeter of the opening 24 through which the lug 22 is passed. The body element 21 is provided with lateral longitudinally extending thin flanges 25,25 which lie against the sheet metal panel 16 and form grooves or valleys 26,26 with the body element 21 in which to receive and retain the distal edges of the metallic-molding strip 12 to be described more fully below.

The exterior metallic-molding strip 12 is integrally formed from a strip of metal and comprises the longitudinally extending lateral side members 32,32 adjacent slightly inturned opposed retention elements 34,34 which with an intermediate web 36 form a recess or groove 38 adapted to receive the plastic insert strip 14. The lateral side portions 32,32 terminate at their distal edges in inturned opposed flanges 40,40 adapted to resiliently engage the clip body 21, whereby the exterior molding structure 10 is mechanically secured to the door panel 16 in tension. The web 36 is spaced from the outer surface of the door panel 16 a distance sufficient to allow for resilient movement of the web when the plastic insert strip 14 is struck by a body or blow causing it to move inwardly. The metallic strip 12 is preferably made of a suitable stainless steel, chrome-plated steel, or aluminum alloy.

Where the exterior molding structure 10 is designed for attachment to the door panel 16 by an adhesive, as illustrated in FIG. 7, the inturned opposed distal flanges of the longitudinally extending metallic-molding strip 12a are elongated and preferably aligned in a single plane. These flanges 40a, 40a are coated on their outer exposed surfaces with a pressure-sensitive urethane-type adhesive, adapted to secure the exterior molding structure to the painted or unpainted outer surface of the door panel 16. The adhesives of this type are well known in the adhesive art and may be selected according to the particular requirements of each application from a number of adhesive manufacturers. The use of adhesives is advocated for the after-market in the event that automobile owners desire to apply the exterior molding structure of this invention without drilling or punching holes 24 in the door or side panels for attachment of the clips 18.

The plastic insert strip 14 comprises a resilient elongated body of plastic material, formed by the extrusion or molding processes, taken from a group including the polyvinyl chlorides, acetates, styrenes, combinations of acetate and styrene materials, polyethylenes, butyrates, acrylics, or their equivalents. The relative resilience of such plastic materials can be modified by admixing fillers thereto, such for example as inorganic pigments, metallic oxides, mineral powders, diatomaceous earths, synthetic fibers, or powdered metals. The plastic insert strip 14, preferably of a hardness in the range of from about 60 to 100 on a durometer scale, can also be formed as an integral duplex strip by the dual extrusion of plastic materials. One portion, that can be denominated the "carrier" portion of such a duplex strip, is preferably made of a relatively hard and rigid filled vinyl, acetate, or styrene material, or a combination of acetate and styrene plastic materials, comprising the principal portion or main body of the strip 14. The second or exposed surface layer portion of such a duplex strip is preferably made of a relatively pure vinyl or polyvinyl chloride material, or a vinyl material with a color filler, and this outer portion is substantially softer and more flexible than the carrier portion. One embodiment of such duplex strip construction is illustrated in FIG. 5.

Each insert strip 14, whether of a single or duplex material, embodies within it a longitudinally extending metallic retention member 44, or a plurality of such members (FIG. 4), which is disposed adjacent the surface 46 of the body 48 of the insert strip. The metallic member 44 is preferably in the form of a wire that can be oval in cross-sectional configuration, or may be of a generally T-sectional form 44A as illustrated in FIG. 6, or in the generally flanged channel-shaped sectional form 44B as illustrated in FIG. 8, or any other suitable form. Whatever the cross-sectional form of the element 44 that may be selected, it is substantially completely embedded in the body 48 of the insert strip with a longitudinally extending area portion 50 (FIG. 3), 50A (FIG. 6), or 50B (FIG. 8) exposed at the surface 46 of the plastic body. Such area portion 50, 50A or 50B is exposed for making intimate physical contact with the web 36 of the metallic-molding strip 12 to which it becomes fusingly welded by the series welding process. The enlarged fragmentary views illustrated in FIGS. 3, 6 and 8 show the intimate physical contact made by the metallic area portion 50, 50A or 50B with the web 36 for such welding. The metal of which the retention element 44, 44A or 44B is made should correspond in each instance with the metal of which the metallic-molding strip 12 or 12A is formed, so that the two metals can be fusingly conjoined by the series welding process.

The plastic insert strip 14a illustrated in FIG. 5 comprises the duplex carrier portion 48a of relatively harder and more rigid plastic material, of the order from about 80 to about 100 on a durometer scale, and the surface layer portion 48b of relatively softer and more flexible plastic material, of the order from about 60 to about 65 on a durometer scale.

The plastic insert strip may be wider or narrower, as the designer prefers. If it is substantially wider, as shown in FIG. 4, wherein the width of the plastic strip 14 is approximately 25 to 35 percent greater than that illustrated in FIGS. 2, 5 and 7, a plurality of the metallic retention elements 44 can be embedded in the plastic body 48 for better securement of the enlarged plastic insert strip 14 within the recess or groove 38 of the metallic-molding strip 12.

The preferred method for embedding the retention element 44, 44A or 44B within the plastic body 48 is to extrude the plastic material about and upon such element as the latter is drawn through a plastic extrusion machine, whereby the element is embedded within the body. In the event that a superficial layer of plastic material should overlie the surface 50, 50A or 50B, following extrusion, such overlayer is easily removed by skiving or shaving the plastic material from the surface to expose it for metal to metal contact with web 36 of the metallic-molding strip 12.

Merely by way of example, FIG. 9 illustrates an arrangement whereby the contact tips 58,58 of the spaced-apart welding electrodes 60,60 are positioned upon the exposed surface of the web 36 and caused to bear fully upon and to apply sufficient pressure against the web so as to being it and the metallic element 44 thereunder into intimate physical contact. The plastic body 48 of insert strip 14 is supported by a die portion 62 thereunder while such pressure is applied by the electrodes 60,60. Welding current is passed through one of the electrodes 60 into the web 36 to the second electrode, causing fusion of the metallic element 44 at its contact surface 50 with a portion of web 36 lying in the path of the welding current. The details of such welding process are well known to persons skilled in the art to which the process pertains.

Upon securement by series welding of the plastic insert strip 14 or 14A to the supporting metallic-molding strip 12 or 12A, as the case may be, the completed exterior molding structure 10 can then be attached to the automobile door panel 16 or an adjacent side panel by means of the retaining clips 18 or by the adhesive layers 20,20 secured to the flanges 40a,40a of the metallic-molding strip 12a. The positioning of the exterior molding structure or bumper strip 10 is preferably made at the line of the automobile body which is most outwardly located, so as to provide the maximum protection against injury of the door or side panels from blows struck by a body moving toward it.

Being made of plastic, the thin flanges 25,25 of the clips 18 resist and tend to prevent corrosive contact between the sheet metal panel, which may be painted or unpainted, and the exterior molding structure 10. The exterior molding structure 10 is secured to the sheet metal door panel 16, or adjacent side panels, by pressing the opposed flanges 40,40 of the metallic-molding strip 12 upon the body element 21 of the clips 18 until the distal edges of the flanges snap into the grooves or recesses 26,26 of the clip, whereby the metallic-molding strip 12 is secured thereon.

Although certain particular embodiments of the invention are herein disclosed for purposes of explanation, further modifications thereof, after study of this specification, will become apparent to those skilled in the art to which the invention pertains. Reference should be had to the appended claims in determining the scope of the invention.

We claim:

1. A composite molding structure designed for service as an exterior bumper strip supported on a vehicle door or side panel and adapted to be secured to such supporting panel by means attached to said panel, comprising in combination:
   a longitudinally extending integrally formed metallic-molding strip having;
      a substantially medial longitudinally extending depressed groove or recess formed by a web and a pair of lateral retention elements formed of said strip;
   and a relatively hard, resilient strip of plastic bumper material secured to said metallic-molding strip in said recess;
   said plastic strip comprising;
      a body having as a part thereof a cross-sectional configuration generally corresponding to the cross-sectional configuration of said recess;
      said body part being seated and held in said recess in close fitting relationship;
      another part of said plastic strip extending forwardly and outwardly of said metallic-molding strip as a resilient bumper;
      and retention means for said plastic strip comprising at least one longitudinally extending metallic retention member substantially embedded in and forming an integral part of said plastic material;
      said metallic retention member having a longitudinally extending area thereof exposed at and substantially in the plane of a surface of said body part seated in and adjacent a surface of said recess;
      said metallic retention member being substantially coextensive in length with said plastic strip;
      said metallic retention member being fusingly welded to said metallic-molding strip in the area of said recess.

2. The structure defined in claim 1, and wherein said metallic-molding strip further comprises:
   side members extending longitudinally along and adjacent said medial recess and laterally away therefrom and generally in the same direction;
   said side members terminating in distal edge portions generally opposed and inturned toward each other and spaced away from the plane of said web;
   said distal edges being adapted to engage and become secured to mechanical means attached to said supporting panel.

3. The structure defined in claim 1, and wherein said metallic-molding strip further comprises:
   side members extending longitudinally along and adjacent said medial recess and laterally away therefrom and generally in the same direction;
   said side members terminating in distal edge portions generally opposed and inturned toward each other and spaced away from the plane of said web;
   and a layer of adhesive on the outer facing surfaces of said distal edge portions for securement of said molding structure to said supporting panel.

4. The structure defined in claim 3, wherein said distal edge portions lie substantially in a plane.

5. The structure defined in claim 1, wherein said metallic retention member comprises a wire having a generally oval cross-sectional configuration.

6. The structure defined in claim 1, wherein said metallic retention member comprises:
   a generally T-shaped member;
      the arms of said member being fully embedded in said plastic body; and
      the edge of the stem of said member being exposed at and in the plane of said surface.

7 The structure defined in claim 1, wherein said metallic retention member comprises:
   a generally flanged channel-shaped member;
      the flanged portions of said member being fully embedded in said plastic body; and
      the web portion of said member having its outer surface exposed at and in the plane of said surface.

8. The structure defined in claim 1, wherein sand plastic strip body further comprises a relatively hard and rigid plastic bumper material.

9. The structure defined in claim 1, wherein said plastic strip body further comprises:
   a first carrier portion substantially filling said recess and formed of a relatively hard and rigid plastic material;
   said retention member being embedded in said first portion;
   and a second outer surface layer of plastic material fused to said first carrier portion and overlying the same at least between the edges of said molding strip retention elements;

said second layer being relatively softer and more flexible than said first carrier portion and projecting outwardly beyond the surface of said metallic-molding strip.

10. The structure defined in claim 9, wherein
said first carrier portion is characterized by a hardness of from about 80 to about 100 on a durometer scale,
and said second softer outer layer is characterized by a hardness of from about 60 to about 65 on a durometer scale.

11. The structure defined in claim 1, wherein said relatively hard, resilient strip of plastic material is characterized by a hardness of from about 60 to about 100 on a durometer scale.